(12) United States Patent
Uemura et al.

(10) Patent No.: US 9,975,984 B2
(45) Date of Patent: May 22, 2018

(54) METHOD FOR PRODUCING BLOCK COPOLYMER, AND BLOCK COPOLYMER OBTAINED USING SAME

(71) Applicant: DIC Corporation, Tokyo (JP)

(72) Inventors: Yukie Uemura, Osaka (JP); Hisakazu Tanaka, Osaka (JP); Nobuhiro Oe, Osaka (JP)

(73) Assignee: DIC CORPORATION, Tokyo (JP)

(*) Notice: Subject to any disclaimer, the term of this patent is extended or adjusted under 35 U.S.C. 154(b) by 0 days. days.

(21) Appl. No.: 15/023,342

(22) PCT Filed: Sep. 11, 2014

(86) PCT No.: PCT/JP2014/074112
§ 371 (c)(1),
(2) Date: Mar. 18, 2016

(87) PCT Pub. No.: WO2015/041146
PCT Pub. Date: Mar. 26, 2015

(65) Prior Publication Data
US 2016/0229943 A1    Aug. 11, 2016

(30) Foreign Application Priority Data

Sep. 20, 2013  (JP) .................................. 2013-195479
Apr. 4, 2014  (JP) .................................. 2014-077679

(51) Int. Cl.
C08F 297/02    (2006.01)
B01J 19/00    (2006.01)
C08F 8/12    (2006.01)

(52) U.S. Cl.
CPC ........ *C08F 297/026* (2013.01); *B01J 19/0093* (2013.01); *C08F 8/12* (2013.01);
(Continued)

(58) Field of Classification Search
CPC ...... C08F 297/02; C08F 297/026; C08F 8/12; B01J 2219/00781; B01J 19/0093
See application file for complete search history.

(56) References Cited

U.S. PATENT DOCUMENTS 5,218,053 A * 6/1993 DuBois ............... C08F 297/026
                                                525/271
5,760,124 A * 6/1998 Listigovers .......... C09D 11/326
                                                106/31.13
(Continued)

FOREIGN PATENT DOCUMENTS

EP    0569100 A1    11/1993
EP    0819738 A2    1/1998
(Continued)

OTHER PUBLICATIONS

JP 2010-180353, Aug. 2010; machine translation.*
(Continued)

*Primary Examiner* — Roberto Rabago
(74) *Attorney, Agent, or Firm* — McDermott Will & Emery LLP

(57) ABSTRACT

The present invention provides a method for producing a block copolymer, which includes subjecting styrene or a derivative thereof (excluding α-methylstyrene) to living anionic polymerization in the presence of a polymerization initiator by means of a microreactor having a channel being capable of mixing a plurality of liquids with each other, reacting a propagation end of the resultant polymer block (A) derived from styrene or a derivative thereof with α-methylstyrene to obtain an intermediate polymer having a polymer unit (B) derived from α-methylstyrene bonded to one end of the polymer block (A), and then subjecting a (meth)acrylate compound (c) to living anionic polymerization in the presence of a polymerization initiator so that the polymer unit (B) derived from α-methyl styrene in the (Continued)

intermediate polymer serves as a propagation end to form a polymer block (C) derived from the (meth)acrylate compound (c).

10 Claims, 5 Drawing Sheets

(52) U.S. Cl.
CPC ............... *B01J 2219/00783* (2013.01); *B01J 2219/00873* (2013.01); *B01J 2219/00889* (2013.01)

(56) References Cited

U.S. PATENT DOCUMENTS

| | | | |
|---|---|---|---|
| 2007/0021589 A1 | 1/2007 | Collier et al. | |
| 2008/0058482 A1* | 3/2008 | Marx | C08F 2/00 526/64 |

FOREIGN PATENT DOCUMENTS

| | | |
|---|---|---|
| EP | 3070132 A1 | 9/2016 |
| JP | 2008-144006 A | 6/2008 |
| JP | 2009-504807 A | 2/2009 |
| JP | 2009-067999 A | 4/2009 |
| JP | 2009-084458 A | 4/2009 |
| JP | 2010-180353 * | 8/2010 |
| JP | 2010-180353 A | 8/2010 |
| JP | 2014-084334 A | 5/2014 |

OTHER PUBLICATIONS

International Search Report issued in PCT/JP2014/074112, dated Dec. 9, 2014.
Supplementary European Search Report issued in corresponding EP Patent Application No. 14 84 5209, dated Jan. 24, 2017.

* cited by examiner

METHOD FOR PRODUCING BLOCK COPOLYMER, AND BLOCK COPOLYMER OBTAINED USING SAME

CROSS REFERENCE

This application is the U.S. National Phase under 35 US.C. § 371 of International Application No. PCT/JP2014/074112, filed on Sep. 11, 2014, which claims the benefit of Japanese Application No. 2014-077679, filed on Apr. 4, 2014 and Japanese Application No. 2013-195479, filed on Sep. 20, 2013, the entire contents of each are hereby incorporated by reference.

TECHNICAL FIELD

The present invention relates to a method for producing a block copolymer of styrene and a (meth)acrylate compound and a block copolymer obtained by the method. Further, the invention relates to a method for producing a block copolymer having a polar group and a block copolymer obtained by the method. More particularly, the invention is concerned with a method for efficiently and smoothly producing a block copolymer having a desired molecular weight in a short time by living anionic polymerization using a microreactor.

BACKGROUND ART

Conventionally, in producing a block copolymer of styrene and a (meth)acrylate compound by living anionic polymerization, a method has been generally employed in which styrene is subjected to living anionic polymerization and one molecule of diphenylethylene is reacted with the resultant propagation end, and then a (meth)acrylate compound is subjected to living anionic polymerization with the diphenylethylene portion (see, for example, PTL 1). However, diphenylethylene has a high reaction rate with the propagation end, as compared to styrene, and therefore diphenylethylene cannot play an appropriate role of capping the active end therewith, but causes an alternating reaction of diphenylethylene with styrene. Therefore, a reaction of diphenylethylene in coexistence with styrene is impossible, and it is essential to react diphenylethylene after styrene is polymerized. In addition, diphenylethylene is expensive and unsuitable for the industrial use.

For this reason, a method for producing a block copolymer of styrene and an alkyl (meth)acrylate without using diphenylethylene by living anionic polymerization has been desired.

On the other hand, as a method for producing a block copolymer having a polar group, living radical polymerization has been known. However, for example, when a block copolymer of styrene and methacrylic acid is produced by living radical polymerization, problems are caused in that the obtained block copolymer has a slightly wide molecular weight distribution, and in that the styrene block chain has caused a portion randomly copolymerized with methacrylic acid, or the methacrylic acid block has caused a portion randomly copolymerized with styrene, and thus a complete block copolymer cannot be obtained.

In the situation mentioned above, obtaining a block copolymer by living anionic polymerization using a microreactor has been proposed (see, for example, PTL 1 and 2). However, in the production of a block copolymer using living anionic polymerization, for example, in polymerization of a polymerizable monomer having a carboxyl group as a polar group, the carboxyl group is a polar group and hence inhibits the polymerization, and thus a problem is encountered in that a block copolymer having a carboxyl group cannot be obtained using the monomer having a carboxyl group as such.

Accordingly, a method for efficiently and smoothly producing a block copolymer having a polar group and having a reduced, randomly copolymerized portion has been desired.

CITATION LIST

Patent Literature

[PTL 1] JP-A-2010-180353
[PTL 2] JP-A-2009-67999

SUMMARY OF INVENTION

Technical Problem

An object to be achieved by the present invention is to provide a method for producing a block copolymer, which is advantageous in that, in producing a block copolymer of styrene and an alkyl (meth)acrylate by living anionic polymerization without using diphenylethylene which is expensive and unsuitable for the industrial use, a block copolymer similar to that obtained when using diphenylethylene can be obtained, and a block copolymer obtained by the method. Further, an object is to provide a method for producing a block copolymer, which is advantageous not only in that a block copolymer having a polar group can be industrially produced, but also in that the block copolymer produced can be easily controlled in the molecular weight and has a very narrow molecular weight distribution, and a block copolymer obtained by the method.

Solution to Problem

The present inventors have conducted extensive and intensive studies with a view toward solving the above-mentioned problems. As a result, it has been found that, by subjecting styrene and an alkyl(meth)acrylate to living anionic polymerization using α-methylstyrene instead of diphenylethylene, a block copolymer similar to that obtained when using diphenylethylene can be obtained, and further found that, by utilizing a difference in the reaction rate for the propagation end between styrene and α-methylstyrene, the feeding step can be simplified, and the present invention has been completed.

Specifically, in the present invention, there are provided a method for producing a block copolymer, which is characterized by comprising, using a microreactor having a channel being capable of mixing a plurality of liquids with each other, subjecting styrene or a derivative thereof (excluding α-methylstyrene) to living anionic polymerization in the presence of a polymerization initiator, and reacting a propagation end of the resultant polymer block (A) derived from styrene or a derivative thereof with α-methylstyrene to obtain an intermediate polymer having a polymer unit (B) derived from α-methylstyrene bonded to one end of the polymer block (A), and then further subjecting a (meth)acrylate compound (c) to living anionic polymerization in the presence of a polymerization initiator so that the polymer unit (B) derived from α-methylstyrene in the intermediate polymer serves as a propagation end to form a polymer block (C) derived from the (meth)acrylate compound (c), and a block copolymer obtained by the method.

Advantageous Effects of Invention

By using the method for producing a block copolymer of the present invention, a block copolymer can be industrially produced without using diphenylethylene which is expensive and unsuitable for the industrial use, and the molecular weight of the block copolymer produced can be easily controlled, and a block copolymer having a very narrow molecular weight distribution can be produced. Further, when diphenylethylene is used, it is necessary to separately feed diphenylethylene to a microreactor, but, when α-methylstyrene is used instead of diphenylethylene, α-methylstyrene can be fed to a microreactor, together with styrene as a raw material for the block copolymer, and therefore there is a merit that one step for feeding and mixing the raw materials can be omitted.

Further, in the method for producing a block copolymer of the invention, by using a (meth)acrylate having a functional group capable of changing to a polar group is used as a polymerizable monomer to be copolymerized with styrene and changing the functional group to a polar group after the copolymerization, a block copolymer having a polar group and having reduced a randomly copolymerized portion can be produced efficiently and smoothly.

DESCRIPTION OF EMBODIMENTS

Figure 1:
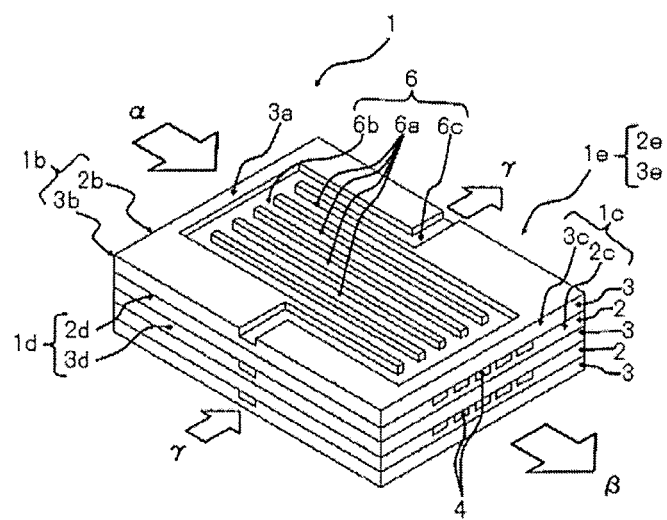
FIG. 1 is a diagrammatic perspective view showing the whole construction of an example of the microreactor used in the method of the invention.

The method for producing a block copolymer of the invention comprises, using a microreactor having a channel being capable of mixing a plurality of liquids with each other, subjecting styrene or a derivative thereof (excluding α-methylstyrene) to living anionic polymerization in the presence of a polymerization initiator, and reacting a propagation end of the resultant polymer block (A) derived from styrene or a derivative thereof with α-methylstyrene to obtain an intermediate polymer having a polymer unit (B) derived from α-methylstyrene bonded to one end of the polymer block (A), and then further subjecting a (meth) acrylate compound (c) to living anionic polymerization in the presence of a polymerization initiator so that the polymer unit (B) derived from α-methylstyrene in the intermediate polymer serves as a propagation end to form a polymer block (C) derived from the (meth)acrylate compound (c), obtaining a block copolymer.

Examples of the styrene derivatives include p-dimethylsilylstyrene, p-vinylphenylmethyl sulfide, p-hexynylstyrene, p-methoxystyrene, p-t-butyldimethylsiloxystyrene, o-methylstyrene, p-methylstyrene, and p-t-butylstyrene. The styrene derivative may be used in combination with styrene, and these styrene derivatives can be used individually or in combination. Hereinafter, the term simply shown as "styrene" indicates meanings of styrene including styrene derivatives, excluding α-methylstyrene (except the description in the Examples and Comparative Examples below).

Examples of the (meth)acrylate compound (c) include alkyl (meth)acrylates, such as methyl (meth)acrylate, ethyl (meth)acrylate, n-butyl (meth)acrylate, sec-butyl (meth) acrylate, t-butyl (meth)acrylate, isopropyl (meth)acrylate, isobutyl (meth)acrylate, 2-ethylhexyl (meth)acrylate, decyl (meth)acrylate, undecyl (meth)acrylate, dodecyl (meth) acrylate (lauryl (meth)acrylate), tridecyl (meth)acrylate, pentadecyl (meth)acrylate, hexadecyl (meth)acrylate, heptadecyl (meth)acrylate, octadecyl (meth)acrylate (stearyl (meth)acrylate), nonadecyl (meth)acrylate, and icosanyl (meth)acrylate; aromatic (meth)acrylates, such as benzyl (meth)acrylate and phenylethyl (meth)acrylate; (meth)acrylates having an alicyclic structure, such as cyclohexyl (meth) acrylate and isobornyl (meth)acrylate; alkyl group-terminal polyalkylene glycol mono(meth)acrylates, such as methoxypolyethylene glycol mono(meth)acrylate, methoxypolypropylene glycol mono(meth)acrylate, octoxypolyethylene glycol mono(meth)acrylate, octoxypolypropylene glycol mono (meth)acrylate, lauroxypolyethylene glycol mono(meth) acrylate, lauroxypolypropylene glycol mono(meth)acrylate, stearoxypolyethylene glycol mono(meth)acrylate, stearoxypolypropylene glycol mono(meth)acrylate, allyloxypolyethylene glycol mono(meth)acrylate, allyloxypolypropylene glycol mono(meth)acrylate, nonylphenoxypolyethylene glycol mono(meth)acrylate, and nonylphenoxypolypropylene glycol mono(meth)acrylate; silane (meth)acrylates, such as trimethylsiloxyethyl (meth)acrylate; (meth)acrylates having a siloxy group, such as a dialkylsiloxy group, a diphenylsiloxy group, a trialkylsiloxy group, or a triphenylsiloxy group; (meth)acrylates having a cage silsesquioxane group; fluorine (meth)acrylates, such as a perfluoroalkylethyl (meth)acrylate; (meth)acrylate compounds, such as glycidyl (meth)acrylate, epoxy (meth)acrylate, ethylene glycol di(meth)acrylate, diethylene glycol di(meth)acrylate, trimethylolpropane tri(meth)acrylate, tetramethylene glycol tetra (meth)acrylate, 2-hydroxy-1,3-diacryloxypropane, 2,2-bis [4-(acryloxymethoxy)phenyl]propane, 2,2-bis[4-(acryloxyethoxy)phenyl]propane, dicyclopentenyl (meth) acrylate, tricyclodecanyl (meth)acrylate, tris(acryloxyethyl) isocyanurate, and urethane (meth)acrylate; and (meth) acrylates having an alkylamino group, such as dimethylaminoethyl(meth)acrylate, diethylaminoethyl (meth)acrylate, and dimethylaminopropyl (meth)acrylate. These (meth)acrylate compounds (c) can be used individually or in combination.

Further, examples of the perfluoroalkylethyl(meth)acrylates include 2-(perfluorobutyl)ethyl(meth)acrylate, 2-(perfluorohexyl)ethyl (meth)acrylate, and 2-(perfluorooctyl) ethyl (meth)acrylate.

In the invention, the term "(meth)acrylate" indicates one of or both of a methacrylate and an acrylate.

When polymerizing the (meth)acrylate compound (c), as another polymerizable monomer, a conjugated monomer, such as acrylonitrile, 1,3-butadiene, isoprene, or vinylpyridine, or the like may be used in combination with the (meth)acrylate compound.

When a block copolymer having a polar group is produced by the method for producing a block copolymer of the invention, the (meth)acrylate compound (c) containing a (meth)acrylate (c1) having a functional group capable of changing to a polar group as an essential component is used.

Examples of the polar group include polar groups, such as a hydroxyl group (—OH), a carboxyl group (—COOH), a sulfonic group (—SO$_3$H), an amino group (—NH$_2$), a sulfonamido group (—SO$_2$NH$_2$), and —C(CF$_3$)$_2$OH, and, of these, a carboxyl group is preferred. As the functional group capable of changing to a polar group in the (meth)acrylate (c1), a functional group having the active hydrogen of a polar group protected by a protecting group is preferred. The active hydrogen of a polar group is protected by a protecting group, and therefore the polar group can be prevented from inhibiting the polymerization upon producing a block copolymer by living anionic polymerization. The polar group protected by a protecting group can be changed to the original polar group by deblocking after producing the block copolymer. As the protecting group, a known protecting group can be used according to the type of the polar group.

When the above-mentioned polar group is a hydroxyl group, examples of protecting groups for the hydroxyl group include a methoxymethyl group, a 2-methoxyethoxymethyl group, a bis(2-chloroethoxy)methyl group, a tetrahydropyranyl group, a 4-methoxytetrahydropyranyl group, a tetrahydrofuranyl group, a triphenylmethyl group, a trimethylsilyl group, a 2-(trimethylsilyl)ethoxymethyl group, a t-butyldimethylsilyl group, a trimethylsilylmethyl group, a t-butyl group, a t-butoxycarbonyl group, a t-butoxycarbonylmethyl group, and a 2-methyl-2-t-butoxycarbonylmethyl group.

When the above-mentioned polar group is a carboxyl group, it is preferred that the carboxyl group is protected by esterification and deblocked by hydrolysis or the like. In this case, examples of the functional groups capable of changing to a carboxyl group include primary alkoxycarbonyl groups, such as a methoxycarbonyl group, an ethoxycarbonyl group, a n-propoxycarbonyl group, and a n-butoxycarbonyl group; secondary alkoxycarbonyl groups, such as an isopropoxycarbonyl group and a sec-butoxycarbonyl group; tertiary alkoxycarbonyl groups, such as a t-butoxycarbonyl group; phenylalkoxycarbonyl groups, such as a benzyloxycarbonyl group; and alkoxyalkylcarbonyl groups, such as an ethoxyethylcarbonyl group.

Specific examples of the (meth)acrylates (c1) in which the polar group is a carboxyl group include alkyl(meth)acrylates, such as methyl(meth)acrylate, ethyl (meth)acrylate, n-propyl(meth)acrylate, isopropyl(meth)acrylate, n-butyl (meth)acrylate, sec-butyl(meth)acrylate, isobutyl(meth) acrylate, 2-ethylhexyl(meth)acrylate, decyl(meth)acrylate, undecyl(meth)acrylate, dodecyl(meth)acrylate (lauryl(meth) acrylate), tridecyl(meth)acrylate, pentadecyl(meth)acrylate, hexadecyl(meth)acrylate, heptadecyl(meth)acrylate, octadecyl(meth)acrylate (stearyl(meth)acrylate), nonadecyl(meth) acrylate, icosanyl (meth)acrylate, and t-butyl(meth)acrylate; phenylalkyl(meth)acrylates, such as benzyl(meth)acrylate; and alkoxyalkyl(meth)acrylates, such as ethoxyethyl(meth) acrylate. These (meth)acrylates (c1) can be used individually or in combination. Of these (meth)acrylates (c1), t-butyl (meth)acrylate or benzyl(meth)acrylate is preferably used because the reaction of changing the (meth)acrylate to a carboxyl group is easy. Further, taking commercial availability into consideration, t-butyl(meth)acrylate is more preferred.

When the (meth)acrylate (c1) is used, as another polymerizable monomer (c2) other than the (meth)acrylate (c1), a monomer other than the above-exemplified (meth)acrylate (c1) among the (meth)acrylate compounds (c) may be used in combination with the (meth)acrylate.

In the method for producing a block copolymer of the invention, the first step is a step for, using a microreactor, subjecting a mixture of styrene and α-methylstyrene to living anionic polymerization in the presence of a polymerization initiator. By performing this step, an intermediate polymer having a polymer unit (B) derived from α-methylstyrene bonded to one end of a polymer block (A) derived from styrene is obtained. Alternatively, in the first step, styrene may be subjected to living anionic polymerization in the presence of a polymerization initiator, and then reacted with α-methylstyrene to obtain an intermediate polymer having a polymer unit (B) derived from α-methylstyrene bonded to one end of a polymer block (A) derived from styrene.

In a conventional method using diphenylethylene, when styrene and diphenylethylene are fed in the form of a mixture to a microreactor, styrene and diphenylethylene undergo an alternating reaction, so that the active end cannot be capped with diphenylethylene, causing a problem in that it is impossible to satisfactorily grow the polymer block (A) derived from styrene. For this reason, it is essential to react diphenylethylene with the styrene polymer after being polymerized, and thus another micromixer for feeding diphenylethylene and mixing it with the styrene polymer is needed. On the other hand, in the method for producing a block copolymer of the invention, styrene and α-methylstyrene in the form of a mixture can be fed to a microreactor, and therefore there is an advantage in that one micromixer can be omitted.

Then, in the second step, using a microreactor, a (meth) acrylate compound (c) is further subjected to living anionic polymerization in the presence of a polymerization initiator so that the polymer unit (B) derived from α-methylstyrene in the intermediate polymer obtained in the first step serves as a propagation end to form a polymer block (C) derived from the (meth)acrylate compound, thereby obtaining an intended block copolymer.

In the above-mentioned living anionic polymerization, when not only styrene, α-methylstyrene, and a polymerization initiator but also at least one additive selected from the group consisting of lithium chloride, lithium perchlorate, N,N,N',N'-tetramethylethylenediamine, and pyridine are present in the system, the living anionic polymerization, which is needed to be conducted generally at a low temperature, can be conducted in a temperature region at which the production is industrially practicable. These additives are considered to have an action of preventing the polymerization initiator (anion) from undergoing a nucleophilic reaction with an ester linkage present in the structure of the polymerizable monomer used in the above-mentioned first embodiment or second embodiment or the structure of the polymer obtained by the polymerization reaction. The amount of the additive used can be appropriately selected according to the amount of the polymerization initiator, but, from the viewpoint of increasing the polymerization reaction rate and facilitating the control of the molecular weight of the polymer formed, the amount of the additive is, relative to 1 mol of the polymerization initiator, preferably 0.05 to 10 mol, more preferably 0.1 to 5 mol.

The above-mentioned styrene, α-methylstyrene, (meth) acrylate compound, and polymerization initiator are preferably diluted with or dissolved in an organic solvent and introduced in the form of a solution into a microreactor.

Examples of the organic solvents include hydrocarbon solvents, such as pentane, hexane, octane, cyclohexane, benzene, toluene, xylene, decalin, tetralin, and derivatives thereof; and ether solvents, such as diethyl ether, tetrahydrofuran (THF), 1,4-dioxane, 1,2-dimethoxyethane, diethylene glycol dimethyl ether, and diglyme. These organic solvents can be used individually or in combination.

When the mixture of styrene and α-methylstyrene used in the first step is diluted with an organic solvent, from the viewpoint of efficiently increasing the yield of the block copolymer per unit time, the concentration of styrene in the mixture is preferably from 0.5 to 8 M (mol/L, which applies to the followings), more preferably in the range of from 1 to 7 M, further preferably in the range of from 2 to 6 M.

Further, when the mixture of styrene and α-methylstyrene used in the first step is diluted with an organic solvent, the concentration of α-methylstyrene in the mixture can be appropriately controlled according to the number of the repeating units of the polymer unit (B) derived from α-methylstyrene in the obtained block copolymer. For example, when the average of the number of the repeating units is 1, the concentration of α-methylstyrene in the mixture is controlled so as to become the same molar number as the molar number of the polymerization initiator in the reaction solution. The above-mentioned number of the repeating units is preferably 1 or more for replacing all the reaction ends of styrene by α-methylstyrene, and, taking the reaction rate of α-methylstyrene into consideration, the number of the repeating units is more preferably in the range of from 1 to 5, further preferably in the range of from 1 to 3.

On the other hand, when the (meth)acrylate compound used in the second step is diluted with an organic solvent, taking into consideration the balance between the mixing properties of the diluted compound with the solution of the intermediate polymer obtained in the first step and the yield of the polymer per unit time, the concentration of the (meth)acrylate compound is preferably 0.5 M or more, more preferably in the range of from 1 to 6 M, further preferably in the range of from 2 to 5 M.

As the above-mentioned polymerization initiator, an organolithium can be used, and examples of organolithiums include alkyllithiums, such as methyllithium, ethyllithium, propyllithium, butyllithium (e.g., n-butyllithium, sec-butyllithium, isobutyllithium, and t-butyllithium), pentyllithium, and hexyllithium; alkoxyalkyllithiums, such as methoxymethyllithium and ethoxymethyllithium; α-methylstyryllithium; diarylalkyllithiums, such as 1,1-diphenylhexyllithium, 1,1-diphenyl-3-methylpentyllithium, and 3-methyl-1,1-diphenylpentyllithium; alkenyllithiums, such as vinyllithium, allyllithium, propenyllithium, and butenyllithium; alkynyllithiums, such as ethynyllithium, butynyllithium, pentynyllithium, and hexynyllithium; aralkyllithiums, such as benzyllithium and phenylethyllithium; aryllithiums, such as phenyllithium and naphthyllithium; heterocyclic lithiums, such as 2-thienyllithium, 4-pyridyllithium, and 2-quinolyllithium; and alkyllithium-magnesium complexes, such as tri(n-butyl)magnesium-lithium and trimethylmagnesium-lithium. Of these, alkyllithiums are preferred because they can efficiently advance the polymerization reaction, and especially preferred are n-butyllithium and sec-butyllithium. Further, n-butyllithium is more preferred because it is easily commercially available and has high safety. These polymerization initiators can be used individually or in combination.

From the viewpoint of efficiently increasing the yield of the polymer per unit time, the concentration of the polymerization initiator in the organic solvent solution is preferably 0.01 M or more, more preferably in the range of from 0.05 to 3 M, further preferably in the range of from 0.1 to 2 M. With respect to the organic solvent with which or in which the polymerization initiator is diluted or dissolved to form a solution, taking into consideration the solubility of the polymerization initiator and the stability of the polymerization initiator activity, hydrocarbon solvents, such as hexane, cyclohexane, benzene, toluene, and xylene, are preferred.

When the solutions of a polymerizable monomer, such as styrene, and a polymerization initiator are introduced at a high concentration to the channel of the microreactor, for allowing the living anionic polymerization to smoothly proceed, it is necessary to surely feed into the channel of the microreactor the solution of a polymerization product of the polymerizable monomer having a high viscosity formed by polymerization. Especially when subjecting the intermediate polymer obtained in the first step and a (meth)acrylate compound to living anionic polymerization, it is necessary that the intermediate polymer solution having a high viscosity obtained in the first step and the (meth)acrylate compound solution having a low viscosity be surely mixed with each other, although the viscosities of the solutions are totally different, to cause living anionic polymerization, making it possible to surely feed the solution of the formed block copolymer having a high viscosity. As a pump for surely introducing the solution having a high viscosity to the channel of the microreactor, a pump enabling high-pressure feeding and having a very small pulsating flow is preferred, and, as such a pump, a plunger pump or a diaphragm pump is preferred.

With respect to the feeding pressure for introducing the solutions of a polymerizable monomer, such as styrene, a polymerization initiator, and the formed intermediate polymer to the channel of the microreactor, from the viewpoint of enabling efficient production of the polymer, the pressure is preferably in the range of from 2 to 32 MPa, more preferably in the range of from 3 to 20 MPa, further preferably in the range of from 4 to 15 MPa. As a pump which can feed the solution at the above pressure, a plunger pump for liquid chromatography is preferred, and a double plunger pump is more preferred. Further preferred is a method in which the solution is fed using a double plunger pump having a damper fitted to the outlet thereof while suppressing the pulsating flow.

The microreactor used in the method of the invention has a channel being capable of mixing a plurality of liquids with each other, and one having a heat-transfer reaction vessel having a channel formed therein is preferred, one having a heat-transfer reaction vessel having formed inside thereof a microtubular channel is more preferred, and one having a heat-transfer reaction vessel having heat-transfer plate-form structures having a plurality of groove portions formed in the surface and being stacked on one another is especially preferred.

The living anionic polymerization reaction in the invention can be conducted at a temperature of −78° C. or lower which is a reaction temperature for a conventional batchwise method, and can also be conducted at a temperature of −40° C. or higher which is a temperature at which the reaction is industrially practicable, and further can be conducted at −28° C. or higher. When the reaction temperature is −40° C. or higher, a polymer can be produced using a cooling apparatus having a simple construction, so that the production cost can advantageously be reduced. Further, when the reaction temperature is −28° C. or higher, a polymer can be produced using a cooling apparatus having a simpler construction, so that the production cost can advantageously be markedly reduced.

In the invention, as a preferred mode of a micromixer system for mixing two or more solutions of a polymerizable monomer or polymer, for introducing the solutions at a high concentration as compared to that in a conventional method to the channel of the microreactor to allow the living anionic polymerization to smoothly proceed, preferred is a micromixer which is capable of mixing the polymerizable monomer solution and the polymerization initiator solution at a high concentration with each other in a short time.

The micromixer is a channel formed in the microreactor, which is capable of mixing a plurality of liquids with each other, and, as the micromixer, a commercially available micromixer can be used. For example, there can be mentioned a microreactor having an interdigital channel structure, a single mixer and a caterpillar mixer, manufactured by Institut fur Mikrotechnik Mainz GmbH (IMM); Microglass Reactor, manufactured by MICROGLASS; Cytos, manufactured by CPC Systems, Inc.; YM-1, YM-2 type Mixer, manufactured by Yamatake Co., Ltd.; Mixing Tee and Tee (T-connector), manufactured by Shimadzu GLC Ltd.; IMT Chip Reactor, manufactured by Institute of Microchemical Technology Co., Ltd.; and Micro High Mixer, a product developed by Toray Engineering Co., Ltd., and any of these micromixers can be used in the invention.

Further, as a preferred mode of a micromixer system, particularly in the second embodiment, for introducing the second polymerizable monomer solution to the channel in the microreactor so that the second polymerizable monomer solution and the intermediate polymer solution obtained by polymerization of the first polymerizable monomer undergo living anionic polymerization to prepare a block copolymer, preferred is a micromixer system that can surely mix with each other the intermediate polymer solution having a high viscosity obtained by polymerization of the first polymerizable monomer and the second polymerizable monomer solution having a low viscosity, although the viscosities of the solutions are totally different.

The above-mentioned micromixer system is preferably a micromixer having formed in the flow joining portion a relatively wide channel space as compared to the channel introducing the solution to the micromixer. By using such a micromixer system, while stably feeding the second polymerizable monomer solution having a low viscosity, the intermediate polymer solution having a high viscosity obtained by polymerization of the first polymerizable monomer and the second polymerizable monomer solution having a low viscosity can be surely mixed with each other.

The micromixer having formed in the flow joining portion a relatively wide channel space as compared to the channel introducing the solution to the micromixer may be a metal unified-type micromixer, or a combination of a micromixer in which a process plate having a channel through which the intermediate polymer solution obtained by polymerization of the first polymerizable monomer passes and a process plate having a channel through which the second polymerizable monomer solution passes are stacked on one another and the two solutions are mixed at the outlets of the channels, and a micromixer having a channel through which the mixed solution passes.

The channel inner diameter of the inlet portion of the micromixer varies depending on the linear velocity of the reaction solution, but is preferably in the range of from 0.1 to 2.0 mm, more preferably in the range of from 0.2 to 1.5 mm. Further, the channel inner diameter of the inlet portion of the micromixer is preferably in the range of from 1 to 5 times the channel inner diameter of the inlet portion, and is more preferably in the range of from 1.5 to 3 times because the yield of the polymer per unit time can be further increased and the mixing efficiency can be improved.

As the reaction apparatus used in the method of the invention, a reaction apparatus having a channel formed in a heat-transfer reaction vessel is preferred, and the channel is preferably microtubular because heating can be rapidly controlled. As the microtubular channel, a channel having a void size such that the cross-sectional area of the channel becomes 0.1 to 4.0 mm$^2$ is preferred from the viewpoint of controlling the polymerization reaction temperature. In the invention, the term "cross-section" means a cross-section taken along the direction perpendicular to the flow direction in the channel, and the term "cross-sectional area" means an area of the cross-section.

The cross-sectional shape of the channel may be a polygonal shape such as a rectangular shape including a square and a rectangle, a trapezoid, a parallelogram, a triangle, and a pentagon (including a shape of the above shapes having their corners rounded, or having a high aspect ratio, i.e., a slit shape), a star shape, a semicircle, a circular shape including an ellipse, or the like. The cross-sectional shape of the channel need not be uniform.

With respect to the method for forming the above-mentioned reaction channel, there is no particular limitation. Generally, a member (X) having a plurality of grooves in the surface thereof and another member (Y) are stacked on one another so that the member (Y) is placed on the surface of the member (X) in which the grooves are present, and fixed to each other by stacking, bonding or the like, forming a space between the member (X) and the member (Y) as the reaction channel.

The channel may further have a heat exchange function. In this case, the heat exchange function may be imparted by, for example, a method of forming a groove which a temperature control fluid flows through on the surface of a member (X), and fixing another member on the surface of the member (X) having the groove formed by bonding or stacking. Generally, the heat exchange function may be imparted by a method in which a member (X) having a groove in the surface thereof and a member (Y) having formed therein a groove through which a temperature control fluid flows are fixed together so that the surface of one member having the groove formed therein is fixed to the surface of another one opposite to the surface having the groove formed therein to form a channel, and a plurality of the members (X) and members (Y) are alternately fixed to one another.

In this case, the groove formed in the surface of the member may be either formed in the form of a so-called groove which is lower than the portion surrounding it, or formed between walls standing on the surface of the member. A method for forming a groove in the surface of the member is arbitrary, and, for example, a method, such as injection molding, a solvent casting method, a melt replica method, cutting, etching, photolithography (including energy-ray lithography), or laser ablation, can be used.

The layout of the channel in the member may be a form of straight line, branch, comb shape, curved line, spiral winding, zigzag, or other arbitrary forms of layout according to the use or purpose.

In addition, the channel may be connected to, for example, a mixing site, an extracting site, a separating site, a flow rate measuring portion, a detector, a storage tank, a membrane filtration mechanism, an inlet or outlet connected to the inside or outside of the device, a by-pass, a developing path of chromatography or electrophoresis, a part of the valve structure (portion around the valve), a pressure applying mechanism, or a vacuum mechanism.

With respect to the external form of the member, there is no particular limitation, and the member can be in a form according to the use or purpose. The form of the member may be, for example, a plate form, a sheet form (including a film form, a ribbon form, and the like), a coating film form, a rod form, or a tube form, or may be shaped articles in other complicated forms. External dimensions of the member including a thickness are preferably uniform. The material for the member is arbitrary, and may be, for example, a polymer, glass, a ceramic, a metal, a semiconductor, or the like.

As mentioned above, the reaction apparatus used in the method of the invention is preferably a reaction apparatus having a channel formed in a heat-transfer reaction vessel, and may be a tube immersed in an oil bath, a water bath, or the like. Further, as the reaction apparatus having a heat-transfer reaction vessel having a channel formed therein, a reaction apparatus having a structure in which heat-transfer plate-form structures having a plurality of groove portions formed in the surface are stacked on one another can be used.

As such a reaction apparatus, there can be mentioned an apparatus having formed in the member the above-mentioned channel (hereinafter, frequently referred to simply as "microchannel") used as, for example, a chemical reaction device.

Hereinbelow, an example of the diagrammatic construction of a microreactor having a preferred mode of the channel used in the invention is described with reference to FIGS. 1 and 2.

Figure 2:
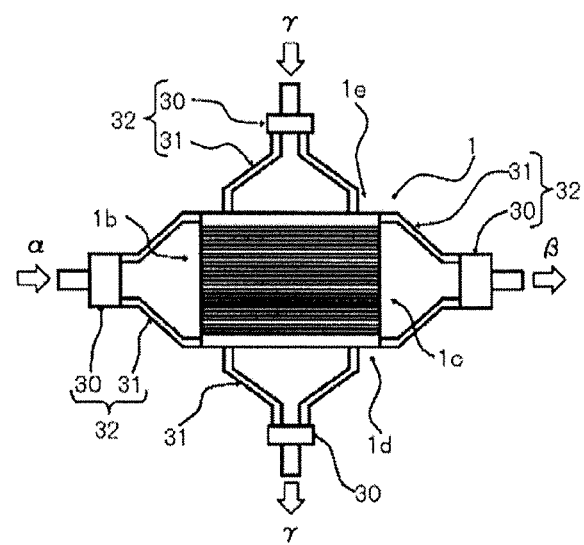
FIG. 2 is a diagrammatic horizontal cross-sectional view showing the whole construction of an example of the microreactor used in the method of the invention.

The above-mentioned chemical reaction device 1, for example, as shown in FIG. 1, has a plurality of first plates (2 in FIG. 1) and second plates (3 in FIG. 1), each of which is formed from the same rectangular plate, and which are alternately stacked on one another. Each of the first plates has formed a channel (4 in FIG. 1; hereinafter, referred to as "reaction channel") (hereinafter, the plate having the reaction channel formed is referred to as "process plate"). The second plate has formed a channel for a temperature control fluid (6 in FIG. 1; hereinafter, referred to as "temperature control channel") (hereinafter, the plate having the temperature control channel formed is referred to as "temperature control plate"). As shown in FIG. 2, introducing inlets and discharge outlets of the channels are dispersed and arranged in the individual regions of edge faces 1b, 1c and sides 1d, 1e of the chemical reaction device 1, and a connecting portion 32 having a connector 30 and a joint portion 31 for flowing a fluid a containing a polymerizable monomer, a polymerization initiator, and an additive and a temperature control fluid γ is connected to each of the above regions.

The fluids flow through the connecting portions so that the fluid α containing a polymerizable monomer, a polymerization initiator, and an additive is introduced from the edge face 1b and discharged to the edge face 1c as a fluid β and the temperature control fluid γ is introduced from the side 1e and discharged to the side 1d. The planar form of the chemical reaction device 1 is not limited to the rectangle shown in the figure, but may be a square or a rectangular form such that the distance between the sides 1d, 1e is larger than the distance between the edge faces 1b, 1c.

By the above-described method, there can be obtained a block copolymer having a polymer block (A) derived from styrene, a polymer unit (B) derived from α-methylstyrene, and a polymer block (C) derived from a (meth)acrylate compound, wherein the polymer block (A), polymer unit (B), and polymer block (C) are bonded to one another in the order of (A)-(B)-(C). Further, when the polymerization initiator used in the living anionic polymerization is n-butyllithium, there can be obtained a block copolymer having a n-butyl group, polymer block (A), polymer unit (B), and polymer block (C) which are bonded to one another in the order of n-butyl group-(A)-(B)-(C).

For achieving the composition close to that of a binary block copolymer having only the polymer block (A) derived from styrene and polymer block (C) derived from a (meth) acrylate compound, the average repeating unit number of the polymer unit (B) derived from α-methylstyrene is preferably in the range of from 1 to 5, more preferably in the range of from 1 to 3. The average repeating unit number of the polymer unit (B) derived from α-methylstyrene can be controlled to be in a desired range by appropriately changing the amount of the fed α-methylstyrene (the concentration in the solution and the feeing rate to a microreactor).

Next, with respect to the above-mentioned method for producing a block copolymer wherein a (meth)acrylate (c1) having a functional group capable of changing to a polar group is used as the (meth)acrylate compound (c), a method for changing the functional group capable of changing to a polar group, which is derived from the (meth)acrylate (c1), to a polar group after obtaining the block copolymer is described. Specifically, an explanation is made on the method for producing a block copolymer having a carboxyl group as a polar group.

When the functional group capable of changing to a carboxyl group is a primary alkoxycarbonyl group, such as a methoxycarbonyl group, or a secondary alkoxycarbonyl group, such as an isopropoxycarbonyl group, the functional group can be changed to a carboxyl group by subjecting it to hydrolysis under basic conditions. As examples of basic compounds used for creating the basic conditions in this case, there can be mentioned metal hydroxides, such as sodium hydroxide and potassium hydroxide.

When the functional group capable of changing to a carboxyl group is a tertiary alkoxycarbonyl group, such as a t-butoxycarbonyl group, the functional group can be changed to a carboxyl group by subjecting it to hydrolysis under acidic conditions. As examples of acid compounds used for creating the acidic conditions in this case, there can be mentioned mineral acids, such as hydrochloric acid, sulfuric acid, and phosphoric acid; Brønsted acids, such as trifluoroacetic acid; and Lewis acids, such as trimethylsilyl triflate.

The reaction conditions for hydrolysis of a t-butoxycarbonyl group under acidic conditions have been disclosed in, for example, "Synthesis of Organic Compounds (Yuukikagoubutsu no Gousei) IV, Lecture on Experiments of Chemistry (Jikken Kagaku Kouza) 16, The fifth edition, edited by The Chemical Society of Japan".

Further, as a method for changing a t-butoxycarbonyl group to a carboxyl group, there can be mentioned a method using a cation-exchange resin instead of the above-mentioned acid. Examples of the cation-exchange resins include resins having at the side chain of the polymer chain an acid group, such as a carboxyl group (—COOH) or a sulfonic group (—SO₃H). Of these, a strongly acidic cation-exchange resin having a sulfonic group at the side chain of the polymer chain is preferred because it can cause the reaction to proceed fast. As an example of a commercially available cation-exchange resin which can be used in the invention, there can be mentioned a strongly acidic cation-exchange resin "Amberlite", manufactured by ORGANO CORPORATION. For achieving effective hydrolysis, the amount of the cation-exchange resin used is, relative to 100 parts by mass of the block copolymer, preferably in the range of from 0.01 to 60 parts by mass, more preferably in the range of from 0.1 to 50 parts by mass.

When the functional group capable of changing to a carboxyl group is a phenylalkoxycarbonyl group, such as a benzyloxycarbonyl group, the functional group can be changed to a carboxyl group by subjecting it to hydrogenation reduction reaction. With respect to the reaction conditions in this case, a phenylalkoxycarbonyl group can be quantitatively changed to a carboxyl group by conducting the reaction using hydrogen gas as a reducing agent in the presence of a palladium catalyst, such as palladium acetate, at room temperature.

As mentioned above, the reaction conditions for changing the functional group to a carboxyl group vary depending on the functional group capable of changing to a carboxyl group. Therefore, for example, when t-butyl(meth)acrylate is used as the (meth)acrylate (c1), a block copolymer, which is obtained by subjecting to copolymerization the t-butyl (meth)acrylate and n-butyl(meth)acrylate as another polymerizable monomer (c2), has a t-butoxycarbonyl group and a n-butoxycarbonyl group. The n-butoxycarbonyl group is not hydrolyzed under the acidic conditions under which the t-butoxycarbonyl group is hydrolyzed, and therefore only the t-butoxycarbonyl group can be selectively hydrolyzed and changed to a carboxyl group. Therefore, by appropriately selecting a polymerizable monomer which is a raw material for the polymer, it is possible to control the acid value of the polymer obtained by the method of the invention.

With respect to the changing of the functional group to a polar group other than the carboxyl group, when the functional group capable of changing to a polar group is a functional group having the active hydrogen of a polar group protected by a protecting group, the functional group can be changed to a polar group by deblocking, and this can be made by a known deblocking method.

EXAMPLES

<Micromixer Used in the Examples>

The microreactor used in the present Examples includes a micromixer composed of a T-pipe joint and a tube reactor connected to the downstream side of the micromixer. As the micromixer, a micromixer custom-made by Sankoh Machinery Co., Ltd., was used (similar one is available by requesting the production based on the description of the present Examples) The micromixer used in the present Examples has inside thereof a first introducing channel, a second introducing channel, and part of the channel at which the above channels join together, and all these channels in the micromixer have the same inner diameter. Therefore, hereinafter, the inner diameter of these channels is collectively referred to as "inner diameter of the micromixer".

Methods for measuring a number average molecular weight, a weight average molecular weight, and a residual monomer content with respect to the polymers produced in the present Examples and Comparative Examples are as follows.

[Method for Measuring a Number Average Molecular Weight and a Weight Average Molecular Weight]

With respect to the polymers obtained in the Examples and Comparative Examples, a number average molecular weight (Mn) and a weight average molecular weight (Mw) were measured by a gel permeation chromatography (GPC) method under the conditions shown below.

Measurement apparatus: High performance GPC apparatus ("HLC-8220GPC", manufactured by Tosoh Corp.)

Column: The following columns, manufactured by Tosoh Corp., connected in series were used.

"TSKgel G5000" (7.8 mm I.D.×30 cm)× one column
"TSKgel G4000" (7.8 mm I.D.×30 cm)× one column
"TSKgel G3000" (7.8 mm I.D.×30 cm)× one column
"TSKgel G2000" (7.8 mm I.D.×30 cm)× one column Detector: RI (Differential refractometer)
Column temperature: 40° C.
Eluent: Tetrahydrofuran (THF)
Flow rate: 1.0 mL/minute
Sample amount per injection: 100 μL (Tetrahydrofuran solution having a sample concentration of 0.4% by mass)

Standard sample: A calibration curve was formed using the standard polystyrenes shown below.

(Standard Polystyrenes)

"TSKgel standard polystyrene A-500", manufactured by Tosoh Corp.
"TSKgel standard polystyrene A-1000", manufactured by Tosoh Corp.
"TSKgel standard polystyrene A-2500", manufactured by Tosoh Corp.
"TSKgel standard polystyrene A-5000", manufactured by Tosoh Corp.
"TSKgel standard polystyrene F-1", manufactured by Tosoh Corp.
"TSKgel standard polystyrene F-2", manufactured by Tosoh Corp.
"TSKgel standard polystyrene F-4", manufactured by Tosoh Corp.
"TSKgel standard polystyrene F-10", manufactured by Tosoh Corp.
"TSKgel standard polystyrene F-20", manufactured by Tosoh Corp.
"TSKgel standard polystyrene F-40", manufactured by Tosoh Corp.
"TSKgel standard polystyrene F-80", manufactured by Tosoh Corp.
"TSKgel standard polystyrene F-128", manufactured by Tosoh Corp.
"TSKgel standard polystyrene F-288", manufactured by Tosoh Corp.
"TSKgel standard polystyrene F-550", manufactured by Tosoh Corp.

[Method for Measuring a Residual Monomer Content]

With respect to the solutions of the polymers obtained in the Examples and Comparative Examples, a residual monomer content was measured and determined using gas chromatography ("Model GC-2014F", manufactured by Shimadzu Corporation) under the conditions shown below.

Column: Wide bore capillary column, manufactured by Shimadzu Corporation
Detector: FID (hydrogen flame ionization detector)
Column temperature: 70 to 250° C.
Sample amount per injection: 1 μL (Tetrahydrofuran diluted solution)

[Method for Measuring an Acid Value]

An acid value was measured in accordance with the JIS test method K 0070-1992. 0.1 g of a sample was dissolved in a mixed solvent of methanol and toluene, and subjected to titration with a 0.1 M alcohol solution of potassium hydroxide using phenolphthalein as an indicator to determine an acid value.

[$^{13}$C-NMR Spectrum Measurement Conditions]

Using an NMR ("Model ECA-500", manufactured by JEOL RESONANCE Inc.), measurement was performed using deuterated chloroform as a solvent.

A block copolymer was produced by living anionic polymerization using α-methylstyrene (Examples 1 to 5).

Example 1

4 Kinds of the solutions shown below were prepared.
(1) Styrene (5.4 M)/α-Methylstyrene (0.6 M) Solution Using a syringe, 50.6 g (55.5 mL) of styrene (hereinafter, abbreviated to "St"), 6.38 g (7.0 mL) of α-methylstyrene (hereinafter, abbreviated to "α-MeSt"), and 27.5 mL of tetrahydrofuran (hereinafter, abbreviated to "THF") were charged into a 100 mL eggplant-shape flask purged with argon gas, and the resultant mixture was stirred to prepare 90 mL of a solution containing St at 5.4 M and α-MeSt at 0.6 M.

(2) t-Butyl Methacrylate (3.6 M) Solution

Using a syringe, 25.6 g (29.0 mL) of t-butyl methacrylate (hereinafter, abbreviated to "t-BMA") and 21.0 mL of THF were charged into a 100 mL eggplant-shape flask purged with argon gas, and the resultant mixture was stirred to prepare 50 mL of a 3.6 M t-BMA solution.

(3) n-Butyllithium (1.2 M) Solution

Using a syringe, 16.2 mL of hexane was charged into a 100 mL eggplant-shape flask purged with argon gas, followed by cooling with ice. After cooling, 13.8 mL of a 2.6 M n-butyllithium (hereinafter, abbreviated to "n-BuLi") solution was charged into the flask, and the resultant mixture was stirred to prepare 30 mL of a 1.2 M n-BuLi solution.

(4) Methanol (1.5 M) Solution

Using a syringe, 2.48 g of methanol and 46.9 mL of THF were charged into a 100 mL eggplant-shape flask purged with argon gas, and the resultant mixture was stirred to prepare 50 mL of a 1.5 M methanol solution.

Then, living anionic copolymerization of St/α-MeSt and t-BMA was conducted in accordance with the following procedure. Three plunger pumps ("PU714", manufactured by GL Science Inc.) were connected to a microreactor apparatus having a micromixer composed of two T-pipe joints and a tube reactor connected to the downstream side of the micromixer. Further, the eggplant-shape flasks respectively containing the above-prepared St/α-MeSt solution, n-BuLi solution, and t-BMA solution were connected to the three plunger pumps, respectively, and they were set so that the individual solutions could be fed to the microreactor apparatus.

Figure 3:
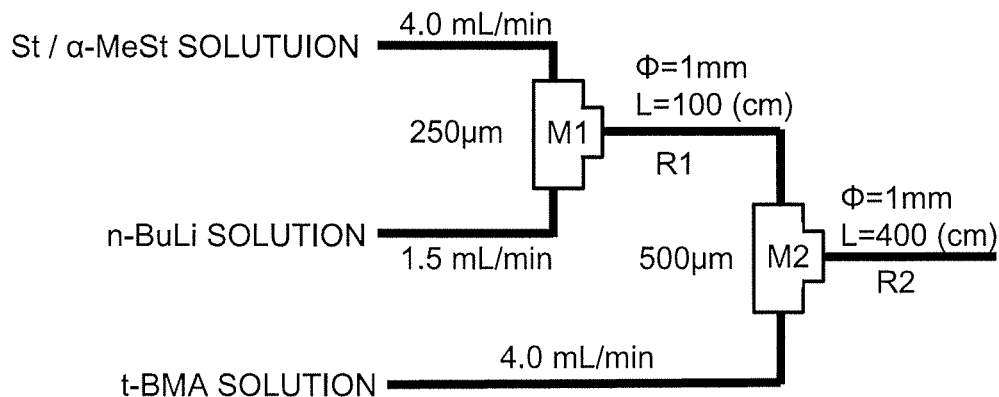
FIG. 3 schematically shows the procedure for reaction in Example 1.

The St/α-MeSt solution and the n-BuLi solution were fed at a rate of 4.0 mL/min and 1.5 mL/min, respectively, from the upstream side of a reactor composed of a micromixer (M1, FIG. 3) having a pipe joint diameter of 250 μm and a tube reactor (R1, FIG. 3) having an inner diameter of 1 mm and a length of 100 cm, and mixed together to effect living anionic polymerization of St/α-MeSt. Subsequently, the resultant St/α-MeSt polymerization solution was mixed with the t-BMA solution being fed at a rate of 4.0 mL/min from the upstream side of a reactor composed of a micromixer (M2, FIG. 3) having a pipe joint diameter of 500 μm and a tube reactor (R2, FIG. 3) having an inner diameter of 1 mm and a length of 400 cm to effect living anionic copolymerization of St/α-MeSt and t-BMA. The resultant polymer solution was poured into a jar containing a predetermined amount of the methanol solution to terminate the polymerization reaction, thereby obtaining a solution of a polymer. The reaction temperature was adjusted to 25° C. by embedding the whole of the microreactor in a thermostat.

From the residual monomer content of the solution of the obtained polymer, it was found that the reaction ratio (polymer conversion) of St was 99.9%, the reaction ratio (polymer conversion) of α-MeSt was 98.8%, and the reaction ratio (polymer conversion) of t-BMA was 99.9%. Further, the design molecular weight of this polymer is 2,602, and the obtained polymer had a number average molecular weight (Mn) of 2,720, a weight average molecular weight (Mw) of 3,270, and a distribution (Mw/Mn) of 1.20. It can be confirmed from these results that, even when using α-MeSt, a polymer having a narrow molecular weight distribution, which is comparable to that of the polymer obtained in Comparative Example 1 using diphenylethylene, is obtained at a high reaction ratio.

Figure 7:
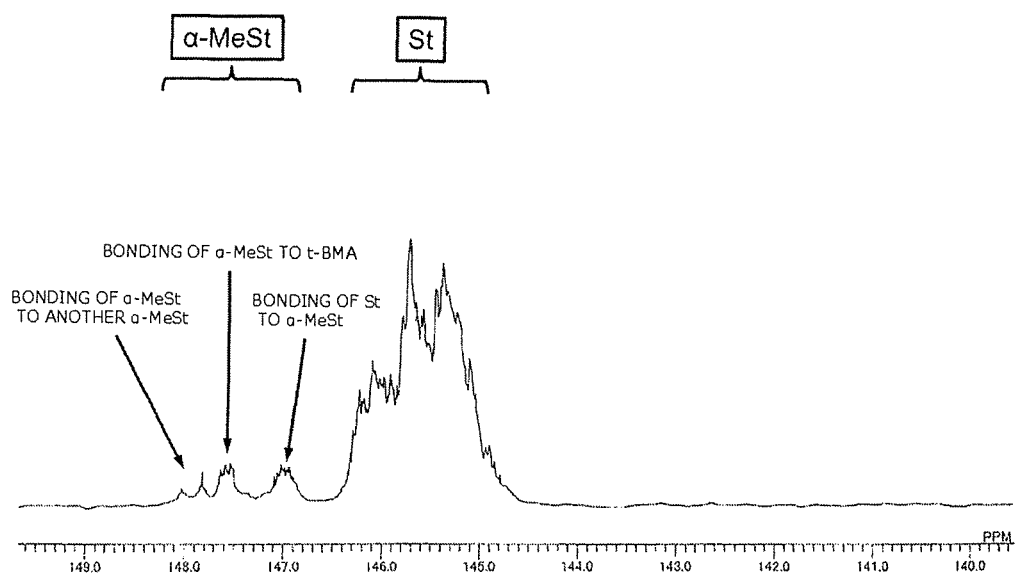
FIG. 7 shows a $^{13}$C-NMR spectrum of the block copolymer obtained in Example 1.

Further, a $^{13}$C-NMR spectrum of the obtained polymer is shown in FIG. 7. The design for this block copolymer in terms of a molar ratio is n-Bu/St/α-MeSt/t-BMA=1/12/1.3/8, namely, a design such that 1.3 α-MeSt is reacted per polymer chain of the block copolymer. In FIG. 7, peaks for bonding of St to α-MeSt, bonding of α-MeSt to t-BMA, and bonding of α-MeSt to another α-MeSt are detected, but bonding of St to t-BMA is not detected, and this result has confirmed that there was obtained a block copolymer having a polymer block (A) derived from St, a polymer unit (B) derived from α-MeSt, and a polymer block (C) derived from t-BMA, wherein the polymer block (A), polymer unit (B), and polymer block (C) are bonded to one another in the order of (A)-(B)-(C).

Example 2

Living anionic copolymerization of St/α-MeSt and t-BMA was conducted in accordance with substantially the same procedure as in Example 1 except that the t-BMA solution was fed at a rate of 6.06 mL/min. From the residual monomer content of the solution of the obtained polymer, it was found that the reaction ratio (polymer conversion) of St was 100%, the reaction ratio (polymer conversion) of α-MeSt was 98.9%, and the reaction ratio (polymer conversion) of t-BMA was 100%. Further, the obtained polymer had a number average molecular weight (Mn) of 3,250, a weight average molecular weight (Mw) of 3,970, and a distribution (Mw/Mn) of 1.23. It can be confirmed from these results that a polymer having a narrow molecular weight distribution, which is comparable to that of the polymer obtained in Comparative Example 1 using diphenylethylene, is obtained at a high reaction ratio.

Example 3

Living anionic copolymerization of St/α-MeSt and t-BMA was conducted in accordance with substantially the same procedure as in Example 1 except that the t-BMA solution was fed at a rate of 8.08 mL/min. From the residual monomer content of the solution of the obtained polymer, it was found that the reaction ratio (polymer conversion) of St was 100%, the reaction ratio (polymer conversion) of α-MeSt was 98.8%, and the reaction ratio (polymer conversion) of t-BMA was 99.9%. Further, the obtained polymer had a number average molecular weight (Mn) of 3,730, a weight average molecular weight (Mw) of 4,760, and a distribution (Mw/Mn) of 1.28. It can be confirmed from these results that a polymer having a narrow molecular weight distribution, which is comparable to that of the polymer obtained in Comparative Example 1 using diphenylethylene, is obtained at a high reaction ratio.

Example 4

The solution shown below was first prepared.

Using a syringe, 56.9 g (62.0 mL) of St, 27.6 g (30.0 mL) of α-MeSt, and 38.0 mL of THF were charged into a 100 mL eggplant-shape flask purged with argon gas, and the resultant mixture was stirred to prepare 90 mL of a solution containing St at 4.2 M and α-MeSt at 1.8 M.

Living anionic copolymerization of St/α-MeSt and t-BMA was conducted in accordance with substantially the same procedure as in Example 1 except that, instead of the St (5.4 M)/α-MeSt (0.6 M) solution used in Example 1, the above-prepared St (4.2 M)/α-MeSt (1.8 M) solution was used. The design for the block copolymer to be obtained in this Example in terms of a molar ratio is St/α-MeSt/t-BMA/n-BuLi=9.3/4.00/8.08/1.00.

From the residual monomer content of the solution of the obtained polymer, it was found that the reaction ratio (polymer conversion) of St was 100%, the reaction ratio (polymer conversion) of α-MeSt was 96.8%, and the reaction ratio (polymer conversion) of t-BMA was 99.9%. Further, the obtained polymer had a number average molecular weight (Mn) of 2,600, a weight average molecular weight (Mw) of 3,190, and a distribution (Mw/Mn) of 1.23. It can be confirmed from these results that a polymer having a narrow molecular weight distribution, which is comparable to that of the polymer obtained in Comparative Example 1 using diphenylethylene, is obtained at a high reaction ratio.

Example 5

4 Kinds of the solutions shown below were first prepared
(1) St (1.82 M)/α-MeSt (0.6 M) Solution Using a syringe, 19.0 g (21.0 mL) of St, 6.38 g (7.0 mL) of α-MeSt, and 72.0 mL of THF were charged into a 100 mL eggplant-shape flask purged with argon gas, and the resultant mixture was stirred to prepare 90 mL of a solution containing St at 1.82 M and α-MeSt at 0.6 M.
(2) t-BMA (2.4 M)/n-BMA (2.7 M) Solution Using a syringe, 34.1 g (38.8 mL) of t-BMA, 38.4 g (42.9 mL) of n-BMA, and 18.3 mL of THF were charged into a 100 mL eggplant-shape flask purged with argon gas, and the resultant mixture was stirred to prepare 100 mL of a solution containing t-BMA at 2.4 M and n-BMA at 2.7 M.
(3) n-BuLi (1.2 M) Solution Using a syringe, 16.2 mL of hexane was charged into a 100 mL eggplant-shape flask purged with argon gas, followed by cooling with ice. After cooling, 13.8 mL of a 2.6 M n-BuLi solution was charged into the flask, and the resultant mixture was stirred to prepare 30 mL of a 1.2 M n-butyllithium solution.
(4) Methanol (1.5 M) Solution Using a syringe, 2.48 g of methanol and 46.9 mL of THF were charged into a 100 mL eggplant-shape flask purged with argon gas, and the resultant mixture was stirred to prepare 50 mL of a 1.5 M methanol solution.

Then, living anionic copolymerization of St/α-MeSt and t-BMA/n-BMA was conducted in accordance with the following procedure. A microreactor apparatus having a micromixer composed of two T-pipe joints and a tube reactor connected to the downstream side of the micromixer, three plunger pumps ("PU714", manufactured by GL Science Inc.), and the eggplant-shape flasks containing the prepared St/α-MeSt solution, n-butyllithium solution, and t-BMA solution, respectively, were connected, and they were set so that the individual solutions could be fed to the microreactor apparatus using the three plunger pumps.

The St/α-MeSt solution and the n-BuLi solution were fed at a rate of 12.0 mL/min and 4.5 mL/min, respectively, from the upstream side of a reactor composed of a micromixer having a pipe joint diameter of 250 μm and a tube reactor having an inner diameter of 1 mm and a length of 100 cm, and mixed together to effect living anionic polymerization of St/α-MeSt. Subsequently, the resultant St/α-MeSt polymerization solution was mixed with the t-BMA/n-BMA solution being fed at a rate of 18.2 mL/min from the upstream side of a reactor composed of a micromixer having a pipe joint diameter of 500 μm and a tube reactor having an inner diameter of 1 mm and a length of 400 cm to effect living anionic copolymerization of St/α-MeSt and t-BMA. The resultant polymer solution was poured into a jar containing a predetermined amount of the methanol solution to terminate the polymerization reaction, thereby obtaining a solution of a polymer. The reaction temperature was adjusted to 25° C. by embedding the whole of the microreactors in a thermostat.

From the residual monomer content of the solution of the obtained polymer, it was found that the reaction ratio (polymer conversion) of St was 99.9%, the reaction ratio (polymer conversion) of α-MeSt was 98.6%, and the reaction ratio (polymer conversion) of each of t-BMA and n-BMA was 99.9%. Further, the obtained polymer had a number average molecular weight (Mn) of 2,630, a weight average molecular weight (Mw) of 3,660, and a distribution (Mw/Mn) of 1.39. It can be confirmed from these results that a polymer having a narrow molecular weight distribution, which is comparable to that of the polymer obtained in Comparative Example 1 using diphenylethylene, is obtained at a high reaction ratio.

Comparative Example 1

5 Kinds of the solutions shown below were prepared.
(1) St (6.0 M) Solution

Using a syringe, 37.5 g (41.5 mL) of St and 18.5 mL of THF were charged into a 100 mL eggplant-shape flask purged with argon gas, and the resultant mixture was stirred to prepare 60 mL of a 6.0 M St solution.
(2) t-BMA (3.6 M) Solution 50 mL of a 3.6 M t-BMA solution was prepared by the same method as in Example 1.
(3) n-BuLi (1.2 M) Solution 30 mL of a 1.2 M n-BuLi solution was prepared by the same method as in Example 1.
(4) Diphenylethylene (1.2 M) Solution Using a syringe, 6.50 g (6.5 mL) of diphenylethylene (hereinafter, abbreviated to "DPE") and 23.5 mL of THF were charged into a 100 mL eggplant-shape flask purged with argon gas, and the resultant mixture was stirred to prepare 30 mL of a 1.2 M DPE solution.
(5) Methanol (1.5 M) Solution 50 mL of a methanol solution having a concentration of 1.5 M was prepared by the same method as in Example 1.

Then, living anionic copolymerization of St and t-BMA was conducted in accordance with the following procedure. Four plunger pumps ("PU714", manufactured by GL Science Inc.) were connected to a microreactor apparatus having a micromixer composed of three T-pipe joints and a tube reactor connected to the downstream side of the micromixer. Further, the eggplant-shape flasks containing the above-prepared St solution, DPE solution, n-BuLi solution, and t-BMA solution, respectively, were connected to the four plunger pumps, respectively, and they were set so that the individual solutions could be fed to the microreactor apparatus.

Figure 6:
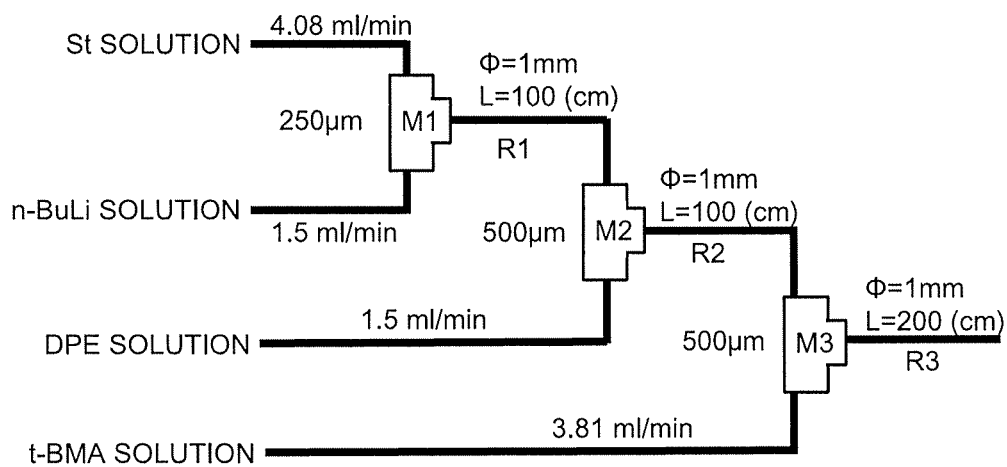
FIG. 6 schematically shows the procedure for reaction in Comparative Example 1.

The St solution and the n-BuLi solution were fed at a rate of 4.08 mL/min and 1.5 mL/min, respectively, from the upstream side of a reactor composed of a micromixer (M1, FIG. 6) having a pipe joint diameter of 250 μm and a tube reactor (R1, FIG. 6) having an inner diameter of 1 mm and a length of 100 cm, and mixed together to effect living anionic polymerization of St. Subsequently, the resultant St polymerization solution was mixed with the DPE solution being fed at a rate of 1.5 mL/min from the upstream side of a reactor composed of a micromixer (M2, FIG. 6) having a pipe joint diameter of 500 μm and a tube reactor (R2, FIG. 6) having an inner diameter of 1 mm and a length of 100 cm to effect a reaction of the reaction initiating end of St with DPE. Then, the resultant reaction solution of the St polymer and DPE was mixed with the t-BMA solution being fed at a rate of 3.81 mL/min from the upstream side of a reactor composed of a micromixer (M3, FIG. 6) having a pipe joint diameter of 500 μm and a tube reactor (R3, FIG. 6) having an inner diameter of 1 mm and a length of 200 cm to effect living anionic copolymerization of St and t-BMA. The resultant polymer solution was poured into a jar containing a predetermined amount of the methanol solution to terminate the polymerization reaction, obtaining a solution of a polymer. The reaction temperature was adjusted to 25° C. by embedding the whole of the microreactors in a thermostat.

From the residual monomer content of the solution of the obtained polymer, it was found that the reaction ratio (polymer conversion) of St was 100%, the reaction ratio (polymer conversion) of DPE was 98.0%, and the reaction ratio (polymer conversion) of t-BMA was 99.9%. Further, the obtained polymer had a number average molecular weight (Mn) of 2,920, a weight average molecular weight (Mw) of 3,490, and a distribution (Mw/Mn) of 1.20.

Comparative Example 2

Instead of the DPE solution used in Comparative Example 1, THF was fed at a rate of 1.5 mL/min and living anionic copolymerization of St and t-BMA was conducted without supplying diphenylethylene. In this Example, after 2 minutes from the start of feeding, the pressure in the system was increased so that all the liquid could not be fed, making it impossible to obtain a block copolymer of St and t-BMA.

The polymerization reaction conditions in the above Examples 1 to 5 and Comparative Examples 1 and 2 and the property values of the obtained polymers are shown in Table 1.

TABLE 1

| | Solution concentration (M) | | | | | | Feed rate (ml/min.) | | | |
|---|---|---|---|---|---|---|---|---|---|---|
| | St | α-MeSt | n-BuLi | DPE | t-BMA | n-BMA | St/MeSt | n-BuLi | DPE | t-BMA |
| Example 1 | 5.4 | 0.6 | 1.2 | — | 3.6 | — | 4 | 1.5 | — | 4.04 |
| Example 2 | 5.4 | 0.6 | 1.2 | — | 3.6 | — | 4 | 1.5 | — | 6.05 |
| Example 3 | 5.4 | 0.6 | 1.2 | — | 3.6 | — | 4 | 1.5 | — | 8.08 |
| Example 4 | 4.2 | 1.8 | 1.2 | — | 3.6 | — | 4 | 1.5 | — | 4.04 |
| Example 5 | 1.8 | 0.6 | 1.2 | — | 2.4 | 2.7 | 12 | 4.5 | — | 18.2 |
| Comparative Example 1 | 6.0 | — | 1.2 | 1.2 | 3.6 | — | 4 | 1.5 | 1.5 | 4.04 |
| Comparative Example 2 | 6.0 | — | 1.2 | — | 3.6 | — | 4 | 1.5 | 1.5 | — |

| | Reaction ratio (%) | | | | Design molecular weight | Molecular weight | | Distribution (Mw/Mn) |
|---|---|---|---|---|---|---|---|---|
| | | | | | | Number average molecular weight (Mn) | Weight average molecular weight (Mw) | |
| | St | α-MeSt | t-BMA | n-BMA | | | | |
| Example 1 | 100 | 98.9 | 99.9 | — | 2,613 | 2,720 | 3,270 | 1.20 |
| Example 2 | 100 | 98.9 | 100 | — | 3,187 | 3,250 | 3,970 | 1.22 |
| Example 3 | 100 | 98.8 | 99.9 | — | 3,762 | 3,730 | 4,760 | 1.28 |
| Example 4 | 100 | 96.8 | 99.9 | — | 2,650 | 2,600 | 3,190 | 1.23 |
| Example 5 | 100 | 98.6 | 99.9 | 99.9 | 3,120 | 2,630 | 3,660 | 1.39 |
| Comparative Example 1 | 100 | — | 98.8 | — | 2,776 | 2,920 | 3,490 | 1.20 |
| Comparative Example 2 | Feeding cannot be made to render polymerization impossible. | | | | | | | |

Next, a block copolymer having a polar group was produced (Examples 6 to 8).

Example 6

Figure 8:
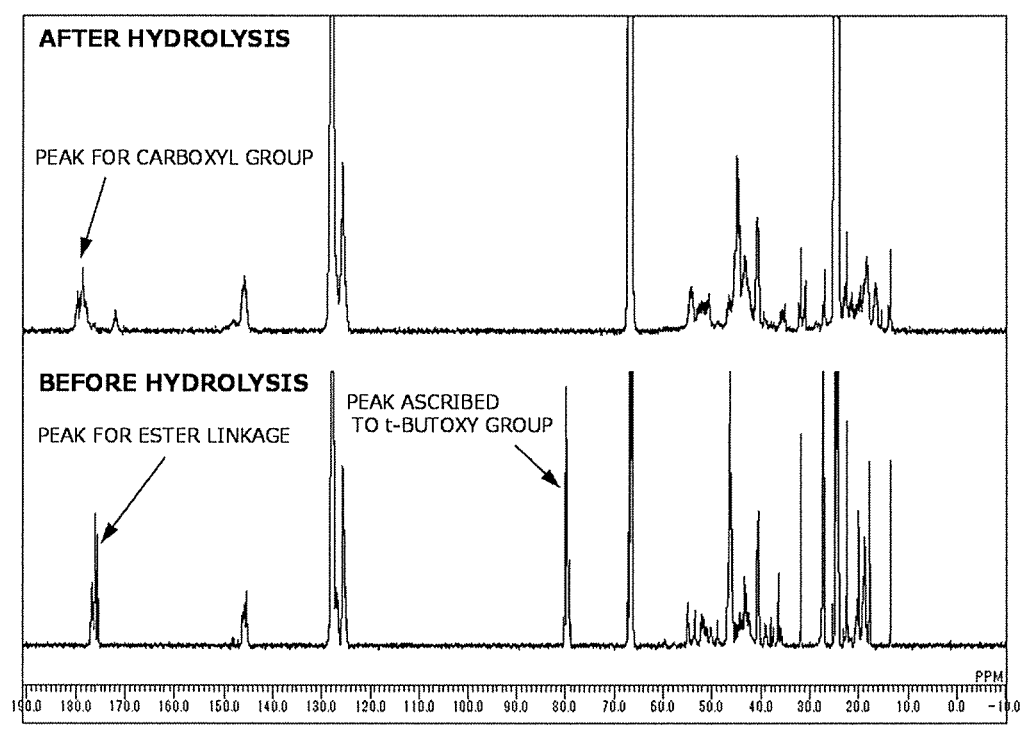
FIG. 8 shows $^{13}$C-NMR spectra of the block copolymer obtained in Example 1 before and after being hydrolyzed.

THF was distilled off from the solution of the polymer obtained in Example 1 using an evaporator, and, instead, xylene was added to the resultant polymer to form a xylene solution. A strongly acidic cation-exchange resin ("Amberlyst 15JS-HG•DRY", manufactured by ORGANO CORPORATION; acid group: sulfonic group) in the same amount as that of the polymer was added to the solution, and the resultant mixture was heated at a temperature of 120° C. for 2 hours to hydrolyze the t-butoxycarbonyl group. The design molecular weight of this polymer after being hydrolyzed is 2,152, and the obtained polymer had a number average molecular weight (Mn) of 2,382, a weight average molecular weight (Mw) of 2,710, and a distribution (Mw/Mn) of 1.14. Further, an acid value was measured. The theoretical acid value is 208, whereas the measured acid value was found to be 145. Further, $^{13}$C-NMR spectra obtained before and after the hydrolysis are shown in FIG. 8. Sharp peaks appearing around 80 ppm (t-butoxy group) and around 175 ppm (ester group), which are ascribed to the t-butoxycarbonyl group and were present before the hydrolysis, have disappeared, and a peak ascribed to the carboxyl group appearing at 170 to 180 ppm has been confirmed. These results have confirmed that a styrene-methacrylic acid block copolymer having a narrow molecular weight distribution was obtained.

Example 7

5 Kinds of the solutions shown below were prepared.
(1) St (5.4 M)
Using a syringe, 50.6 g (55.5 mL) of styrene St and 34.5 mL of THF were charged into a 100 mL eggplant-shape flask purged with argon gas, and the resultant mixture was stirred to prepare 90 mL of a 5.4 M St solution.
(2) α-MeSt (3.2 M) Solution
Using a syringe, 34.0 g (37.4 mL) of α-MeSt and 52.6 mL of THF were charged into a 100 mL eggplant-shape flask purged with argon gas, and the resultant mixture was stirred to prepare 50 mL of a 3.2 M α-MeSt solution.
(3) t-BMA (3.6 M) Solution
50 mL of a 3.6 M t-BMA solution was prepared by the same method as in Example 1.
(4) n-BuLi (1.6 M) Solution
A 1.6 M hexane solution of n-BuLi (manufactured by Kanto Chemical Co., Inc.) which is a commercially available product was used as such.
(5) Methanol (1.5 M) Solution
50 mL of a 1.5 M methanol solution was prepared by the same method as in Example 1.

Then, living anionic copolymerization of St, α-MeSt, and t-BMA was conducted in accordance with the following procedure. Four plunger pumps ("PU714", manufactured by GL Science Inc.) were connected to a microreactor apparatus having a micromixer composed of three T-pipe joints and a tube reactor connected to the downstream side of the micromixer. Further, the eggplant-shape flasks containing the above-prepared St solution, α-MeSt solution, n-BuLi solution, and t-BMA solution, respectively, were connected to the four plunger pumps, respectively, and they were set so that the individual solutions could be fed to the microreactor apparatus.

Figure 4:
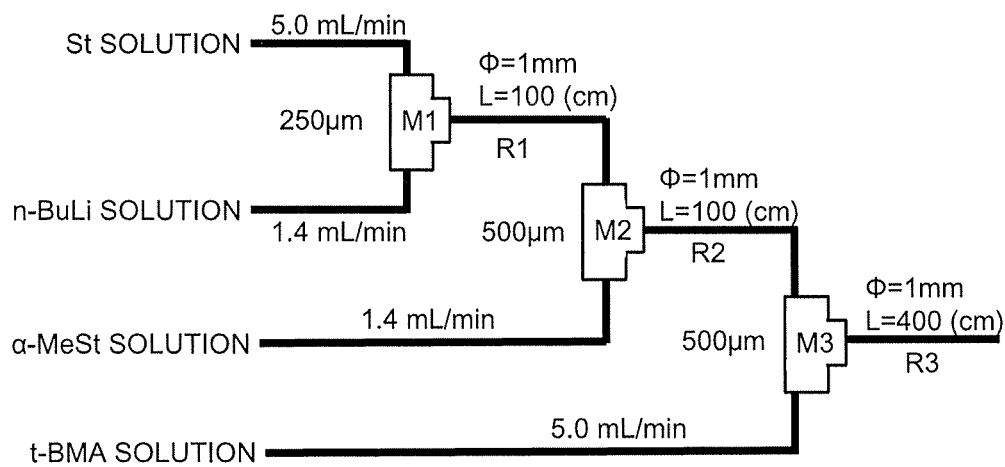
FIG. 4 schematically shows the procedure for reaction in Example 7.

The St solution and the n-BuLi solution were fed at a rate of 5.0 mL/min and 1.4 mL/min, respectively, from the upstream side of a reactor composed of a micromixer (M1, FIG. 4) having a pipe joint diameter of 250 μm and a tube reactor (R1, FIG. 4) having an inner diameter of 1 mm and a length of 100 cm, and mixed together to effect living anionic polymerization of St. Subsequently, the resultant St polymerization solution was mixed with the α-MeSt solution being fed at a rate of 1.4 mL/min from the upstream side of a reactor composed of a micromixer (M2, FIG. 4) having a pipe joint diameter of 500 μm and a tube reactor (R2, FIG. 4) having an inner diameter of 1 mm and a length of 100 cm to effect a reaction of the reaction initiating end of St with α-MeSt. Then, the resultant St/α-MeSt polymerization solution was mixed with the t-BMA solution being fed at a rate of 5.0 mL/min from the upstream side of a reactor composed of a micromixer (M3, FIG. 4) having a pipe joint diameter of 500 μm and a tube reactor (R3, FIG. 4) having an inner diameter of 1 mm and a length of 400 cm to effect living anionic copolymerization of St/α-MeSt and t-BMA. The resultant polymer solution was poured into a jar containing a predetermined amount of the methanol solution to terminate the polymerization reaction, obtaining a solution of a polymer. The reaction temperature was adjusted to 25° C. by embedding the whole of the microreactors in a thermostat.

From the residual monomer content of the solution of the obtained polymer, it was found that the reaction ratio (polymer conversion) of St was 100%, the reaction ratio (polymer conversion) of α-MeSt was 94.1%, and the reaction ratio (polymer conversion) of t-BMA was 100%. Further, the design molecular weight of this polymer is 2,701 (the design for this block copolymer in terms of a molar ratio is n-Bu/St/α-MeSt/t-BMA=1/12/2/8), and the obtained polymer had a number average molecular weight (Mn) of 2,895, a weight average molecular weight (Mw) of 3,393, and a distribution (Mw/Mn) of 1.20. It can be confirmed from these results that, even when α-MeSt is not used in the form of a solution of a mixture thereof with St, a polymer having a narrow molecular weight distribution, which is comparable to that of the polymer obtained in Comparative Example 1 using diphenylethylene, is obtained at a high reaction ratio.

THF was distilled off from the above-obtained solution of the polymer using an evaporator, and, instead, xylene was added to the resultant polymer to form a xylene solution. A strongly acidic cation-exchange resin ("Amberlyst 15JS-HG•DRY", manufactured by ORGANO CORPORATION; acid group: sulfonic group) in the same amount as that of the polymer was added to the solution, and the resultant mixture was heated at a temperature of 120° C. for 2 hours to hydrolyze the t-butoxycarbonyl group. The design molecular weight of this polymer after being hydrolyzed is 2,232, and the obtained polymer had a number average molecular weight (Mn) of 2,471, a weight average molecular weight (Mw) of 2,917, and a distribution (Mw/Mn) of 1.18. Further, an acid value was measured. The theoretical acid value is 201, whereas the measured acid value was found to be 147. These results have confirmed that a styrene-methacrylic acid block copolymer having a narrow molecular weight distribution is obtained.

Example 8

4 Kinds of the solutions shown below were prepared.
(1) St (1.87 M)/α-MeSt (0.93 M) Solution
Using a syringe, 54.5 g (60.2 mL) of St, 30.8 g (33.8 mL) of α-MeSt, and 186 mL of THF were charged into a 300 mL eggplant-shape flask purged with argon gas, and the resultant mixture was stirred to prepare 9,280 mL of a solution containing St at 1.87 M and α-MeSt at 0.93 M.
(2) t-BuMA (2.89 M)/n-butyl Methacrylate (2.17 M) Solution
Using a syringe, 32.9 g (37.5 mL) of t-BMA, 24.7 g (27.6 mL) of n-butyl methacrylate (hereinafter, abbreviated to "n-BMA"), and 14.9 mL of THF were charged into a 100 mL eggplant-shape flask purged with argon gas, and the resultant mixture was stirred to prepare 80 mL of a solution containing t-BMA at 2.89 M and n-BMA at 2.17 M.
(3) n-BuLi (1.2 M) Solution
A 1.6 M hexane solution of n-BuLi (manufactured by Kanto Chemical Co., Inc.) which is a commercially available product was used as such.
(4) Methanol (1.5 M) Solution 50 mL of a 1.5 M methanol solution was prepared by the same method as in Example 1.

Then, living anionic copolymerization of St/α-MeSt and t-BMA/n-BMA was conducted in accordance with the following procedure. Three plunger pumps ("PU714", manufactured by GL Science Inc.) were connected to a microreactor apparatus having a micromixer composed of two T-pipe joints and a tube reactor connected to the downstream side of the micromixer. Further, the eggplant-shape flasks containing the above-prepared St/α-MeSt solution, n-BuLi solution, and t-BMA/n-BMA solution, respectively, were connected to the three plunger pumps, respectively, and they were set so that the individual solutions could be fed to the microreactor apparatus.

Figure 5:
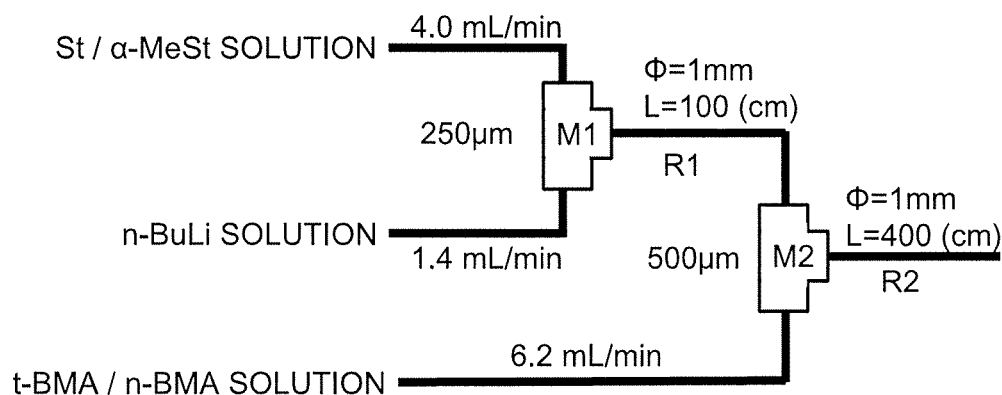
FIG. 5 schematically shows the procedure for reaction in Example 8.

The St/α-MeSt solution and the n-BuLi solution were fed at a rate of 4.0 mL/min and 1.4 mL/min, respectively, from the upstream side of a reactor composed of a micromixer (M1, FIG. 5) having a pipe joint diameter of 250 μm and a tube reactor (R1, FIG. 5) having an inner diameter of 1 mm and a length of 100 cm, and mixed together to effect living anionic polymerization of St/α-MeSt. Subsequently, the resultant St/α-MeSt polymerization solution was mixed with the t-BMA/n-BMA solution being fed at a rate of 6.2 mL/min from the upstream side of a reactor composed of a micromixer (M2, FIG. 5) having a pipe joint diameter of 500 μm and a tube reactor (R2, FIG. 5) having an inner diameter of 1 mm and a length of 400 cm to effect living anionic copolymerization of St/α-MeSt and t-BMA/n-BMA. The resultant polymer solution was poured into a jar containing a predetermined amount of the methanol solution to terminate the polymerization reaction, obtaining a solution of a polymer. The reaction temperature was adjusted to 25° C. by embedding the whole of the microreactors in a thermostat.

From the residual monomer content of the solution of the obtained polymer, it was found that the reaction ratio (polymer conversion) of St was 100%, the reaction ratio (polymer conversion) of α-MeSt was 95.2%, the reaction ratio (polymer conversion) of t-BMA was 99.9%, and the reaction ratio (polymer conversion) of n-BMA was 100%. Further, the design molecular weight of this polymer is 2,682 (the design for this block copolymer in terms of a molar ratio is n-Bu/St/α-MeSt/t-BMA/n-BMA=1/4/2/8/6), and the obtained polymer had a number average molecular weight (Mn) of 2,930, a weight average molecular weight (Mw) of 3,750, and a distribution (Mw/Mn) of 1.28. It can be confirmed from these results that, even when the polymer block of t-BMA in Examples 1 and 2 is changed to a polymer block of a combination of t-BMA and n-BMA, a polymer having a narrow molecular weight distribution, which is comparable to those of the polymers obtained in Examples 1 and 2, is obtained at a high reaction ratio.

THF was distilled off from the above-obtained solution of the polymer using an evaporator, and, instead, xylene was added to the resultant polymer to form a xylene solution. A strongly acidic cation-exchange resin ("Amberlyst 15JS-HG•DRY", manufactured by ORGANO CORPORATION; acid group: sulfonic group) in the same amount as that of the polymer was added to the solution, and the resultant mixture was heated at a temperature of 120° C. for 2 hours to hydrolyze only the t-butoxycarbonyl group. The design molecular weight of this polymer after being hydrolyzed is 2,251, and the obtained polymer had a number average molecular weight (Mn) of 2,461, a weight average molecular weight (Mw) of 3,002, and a distribution (Mw/Mn) of 1.22. Further, an acid value was measured. The theoretical acid value is 199, whereas the measured acid value was found to be 143. These results have confirmed that a styrene-(meth-acrylic acid/n-butyl methacrylate) block copolymer having a narrow molecular weight distribution is obtained.

Comparative Example 3

THF was distilled off from the solution of the polymer obtained in Comparative Example 1 using an evaporator, and, instead, xylene was added to the resultant polymer to form a xylene solution. A strongly acidic cation-exchange resin ("Amberlyst 15JS-HG•DRY", manufactured by ORGANO CORPORATION; acid group: sulfonic group) in the same amount as that of the polymer was added to the solution, and the resultant mixture was heated at a temperature of 120° C. for 2 hours to hydrolyze the t-butoxycarbonyl group. The design molecular weight of this polymer after being hydrolyzed is 2,175, and the obtained polymer had a number average molecular weight (Mn) of 2,450, a weight average molecular weight (Mw) of 2,740, and a distribution (Mw/Mn) of 1.12. Further, an acid value was measured. The theoretical acid value is 195, whereas the measured acid value was found to be 145. Comparative Example 1 is taken as an example of the conventional technique which is to be compared with the example using α-MeSt instead of DPE.

Comparative Example 4

Using a batch reaction vessel, a styrene-methacrylic acid block copolymer was produced by living radical polymerization (reversible addition-fragmentation chain transfer (RAFT) polymerization method). In a 500 L flask equipped with a stirrer and a nitrogen gas introducing pipe, 200 ml of a benzene solution containing 20.0 g of St, 0.1 g of 2,2'-azobis(2-methylpropionitrile) (hereinafter, abbreviated to "AIBN"), and 6.4 g of 4-cyano-4[(dodecylsulfanilthiocarbonyl)sulfanil]pentanoic acid was prepared. The inside of the flask was purged with argon gas, and then the temperature of the solution was elevated to 60° C. and the solution was heated for 8 hours to effect a polymerization. After 8 hours, the reaction ratio of St was 89.4%. Then, 18.2 g of methacrylic acid (hereinafter, frequently abbreviated to "MA") and 0.1 g of AIBN were charged into the flask and a polymerization was further conducted at 60° C. for 8 hours to prepare a styrene-methacrylic acid block copolymer.

From the residual monomer content of the solution of the obtained polymer, it was found that the reaction ratio (polymer conversion) of St was 95.2% and the reaction ratio (polymer conversion) of methacrylic acid was 92.3%. Further, the design molecular weight of this polymer is 2,789, and the obtained polymer had a number average molecular weight (Mn) of 2,532, a weight average molecular weight (Mw) of 3,494, and a distribution (Mw/Mn) of 1.38. Further, an acid value was measured. As a result, the measured acid value was found to be 141. In this living radical polymerization, a molecular weight close to the expected molecular weight was obtained, but the molecular weight distribution was slightly wide, and it has been confirmed that the polymerization has a problem in that, for obtaining a block copolymer, it is necessary to initiate polymerization of methacrylic acid before styrene has completed 100% reaction, so that a complete styrene-methacrylic acid block copolymer cannot be formed.

The molar ratios of the individual raw materials charged, the reaction ratios, and the property values of the obtained polymers in the above Examples 6 to 8 and Comparative Examples 3 and 4 are shown in Table 2. The property values of the polymers in Examples 6 to 8 and Comparative Example 3 are those obtained after the hydrolysis.

TABLE 2

| | Molar ratio of raw materials charged | | | | | | | Reaction ratio (%) | | |
|---|---|---|---|---|---|---|---|---|---|---|
| | n-BuLi | St | α-MeSt | DPE | t-BMA | n-BMA | MAA | St | α-MeSt | DPE |
| Example 6 | 1 | 12 | 1.3 | | 8 | | | 99.9 | 98.8 | |
| Example 7 | 1 | 12 | 2 | | 8 | | | 100 | 94.1 | |
| Example 8 | 1 | 4 | 2 | | 8 | 6 | | 100 | 95.2 | |
| Comparative Example 3 | 1 | 12 | | 1 | 8 | | | 100 | | 98.0 |
| Comparative Example 4 | | 12 | | | | | 8 | 95.2 | | |

| | Reaction ratio (%) | | | Property values of polymer | | | | |
|---|---|---|---|---|---|---|---|---|
| | t-BMA | n-BMA | MAA | Design molecular weight | Number average molecular weight (Mn) | Weight average molecular weight (Mw) | Distribution (Mw/Mn) | Measured acid value |
| Example 6 | 99.9 | | | 2,152 | 2,382 | 2,710 | 1.14 | 145 |
| Example 7 | 100 | | | 2,232 | 2,471 | 2,917 | 1.18 | 147 |
| Example 8 | 99.9 | 100 | | 2,251 | 2,461 | 3,002 | 1.22 | 143 |
| Comparative Example 3 | 99.9 | | | 2,175 | 2,450 | 2,740 | 1.12 | 145 |
| Comparative Example 4 | | | 92.3 | 2,789 | 2,532 | 3,494 | 1.38 | 141 |

REFERENCE SIGNS LIST

1: Microreactor
α: Mixed fluid for fluid
β: Reaction fluid for fluid
γ: Temperature control fluid
1b: Edge face of chemical reaction device
1c: Edge face of chemical reaction device
1d: Side of chemical reaction device
1e: Side of chemical reaction device
2: First plate (process plate)
2b: Edge face of first plate
2c: Edge face of first plate
2d: Side of first plate
2e: Side of first plate
3: Second plate (temperature control plate)
3a: Surface of second plate
3b: Edge face of second plate
3c: Edge face of second plate
3d: Side of second plate
3e: Side of second plate
6 Temperature control channel having a depressed groove shape in cross-section
6a: Main channel having a depressed groove shape in cross-section
6b: Feed side channel having a depressed groove shape in cross-section
6c: Discharge side channel having a depressed groove shape in cross-section
30: Connector
31: Joint portion
32: Connecting portion

The invention claimed is:

1. A method for producing a block copolymer, which comprises:
   forming a mixture of monomers,
   then subjecting the mixture of monomers to living anionic polymerization in the presence of a polymerization initiator by feeding the mixture of monomers and polymerization initiator to a microreactor having a channel being capable of mixing a plurality of liquids with each other, wherein the mixture of monomers includes (i) styrene or a derivative thereof together with (ii) α-methylstyrene to thereby obtain an intermediate polymer having a polymer unit (B) derived from α-methylstyrene bonded to one end of a polymer block (A) derived from styrene or the derivative thereof, and then subjecting a (meth)acrylate compound (c) to living anionic polymerization in the presence of a polymerization initiator so that the polymer unit (B) derived from α-methylstyrene in the intermediate polymer serves as a propagation end, to thereby form a polymer block (C) derived from the (meth)acrylate compound (c).

2. The method for producing a block copolymer according to claim 1, wherein the (meth)acrylate compound (c) contains as an essential component a (meth)acrylate (c1) having a functional group capable of changing to a polar group, and after the polymer block (C) is formed, the functional group capable of changing to a polar group in the polymer block (C) is changed to a polar group.

3. The method for producing a block copolymer according to claim 2, wherein the polar group is a carboxyl group.

4. The method for producing a copolymer according to claim 2, wherein the (meth)acrylate (c1) is t-butyl (meth)acrylate, and a t-butoxycarbonyl group, which is the functional group capable of changing to a polar group, is changed to a carboxyl group by hydrolysis.

5. The method for producing a block copolymer according to claim 2, wherein the polymer block (C) is a polymer block derived from the (meth)acrylate (c1) and another polymerizable monomer (c2).

6. A method for producing a block copolymer, which comprises:
   feeding a mixture of monomers to a microreactor having a channel being capable of mixing a plurality of liquids with each other,
   subjecting the mixture of monomers to living anionic polymerization in the presence of a polymerization initiator, wherein the mixture of monomers includes (i)

styrene or a derivative thereof together with (ii) α-methylstyrene to thereby obtain an intermediate polymer having a polymer unit (B) derived from α-methylstyrene bonded to one end of a polymer block (A) derived from styrene or the derivative thereof, and then subjecting a (meth)acrylate compound (c) to living anionic polymerization in the presence of a polymerization initiator so that the polymer unit (B) derived from α-methylstyrene in the intermediate polymer serves as a propagation end, to thereby form a polymer block (C) derived from the (meth)acrylate compound (c).

7. The method for producing a block copolymer according to claim 6, wherein the (meth)acrylate compound (c) contains as an essential component a (meth)acrylate (c1) having a functional group capable of changing to a polar group, and after the polymer block (C) is formed, the functional group capable of changing to a polar group in the polymer block (C) is changed to a polar group.

8. The method for producing a block copolymer according to claim 7, wherein the polar group is a carboxyl group.

9. The method for producing a copolymer according to claim 7, wherein the (meth)acrylate (c1) is t-butyl (meth)acrylate, and a t-butoxycarbonyl group, which is the functional group capable of changing to a polar group, is changed to a carboxyl group by hydrolysis.

10. The method for producing a block copolymer according to claim 7, wherein the polymer block (C) is a polymer block derived from the (meth)acrylate (c1) and another polymerizable monomer (c2).

\* \* \* \* \*